United States Patent
van Riel

(10) Patent No.: US 9,514,228 B2
(45) Date of Patent: Dec. 6, 2016

(54) BANNING TAGS

(75) Inventor: Henri Han van Riel, Nashua (NL)

(73) Assignee: Red Hat, Inc., Raleigh, NC (US)

( * ) Notice: Subject to any disclaimer, the term of this patent is extended or adjusted under 35 U.S.C. 154(b) by 436 days.

(21) Appl. No.: 11/945,367

(22) Filed: Nov. 27, 2007

(65) Prior Publication Data

US 2009/0138506 A1 May 28, 2009

(51) Int. Cl.
*G06F 7/00* (2006.01)
*G06F 17/30* (2006.01)

(52) U.S. Cl.
CPC ................... *G06F 17/30867* (2013.01)

(58) Field of Classification Search
CPC .................................................. G06F 17/3082
USPC ............................................................ 707/1
See application file for complete search history.

(56) References Cited

U.S. PATENT DOCUMENTS

| 5,835,722 | A * | 11/1998 | Bradshaw et al. | 709/225 |
| 7,392,466 | B2 * | 6/2008 | Pan et al. | 715/200 |
| 8,683,342 | B2 | 3/2014 | Van Riel | |
| 8,762,327 | B2 | 6/2014 | Van Riel | |
| 2007/0174247 | A1 * | 7/2007 | Xu et al. | 707/3 |
| 2008/0250031 | A1 * | 10/2008 | Ting et al. | 707/100 |

* cited by examiner

*Primary Examiner* — Usmaan Saeed
*Assistant Examiner* — Paul Kim
(74) *Attorney, Agent, or Firm* — Lowenstein Sandler LLP

(57) ABSTRACT

An embodiment relates generally to a method of editorial control. The method includes providing for at least one piece of content and determining a set of banned tags. Each banned tag is prevented from being applied to the at least one piece of content. The method also includes associating the set of banned tags to the at least one piece of content as a policy and receiving a tag term for the at least one piece of content at the first website. The method further includes comparing the tag term with the policy.

7 Claims, 6 Drawing Sheets

BANNING TAGS

FIELD

This invention relates generally to tag terms, more particularly, to systems and methods for banning tags.

DESCRIPTION OF THE RELATED ART

A tag can be is a relevant keyword or term associated with or assigned to a piece of information. The piece of information can be a digital image, a geographic map, a blog entry, video clip, etc. Accordingly, the tags describe the item and can enable keyword-based classification and search of information.

Tagging can be a useful tool. For example, a website like Flickr allows users to tag images with many specific nouns, verbs, and/or adjectives that describe the picture. Accordingly, the image then becomes searchable.

However, as the content of one website is distributed, i.e., syndicated, to other websites, the author of the content may lose control of what tags are applied to the content. For some authors, having an unauthorized tag applied to their content can be irksome problem. One example could be photograph of a man and the author not wanting the tag "serial killer" attached to it. Accordingly, some authors have sued websites to have inappropriate tags removed. Thus, there is a need in the art for a mechanism that prevents inappropriate tags to be applied to content.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of websites, and that any such variations do not depart from the true spirit and scope of the present invention.

Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to systems and methods for author-centric control of content. More particularly, a tag control module can be configured to receive a list of banned tags from an author of a piece of content. The entered list of banned tags is then associated with the piece of content as a policy. The list of banned tags as a policy can then be placed with the content for syndication such as an RSS feed. As the content and the policy are propagated to subsequent web sites, the policy is then enforced at the subsequent websites, which prevents any subsequent users from using any banned terms listed in the policy on the content.

Figure 1:
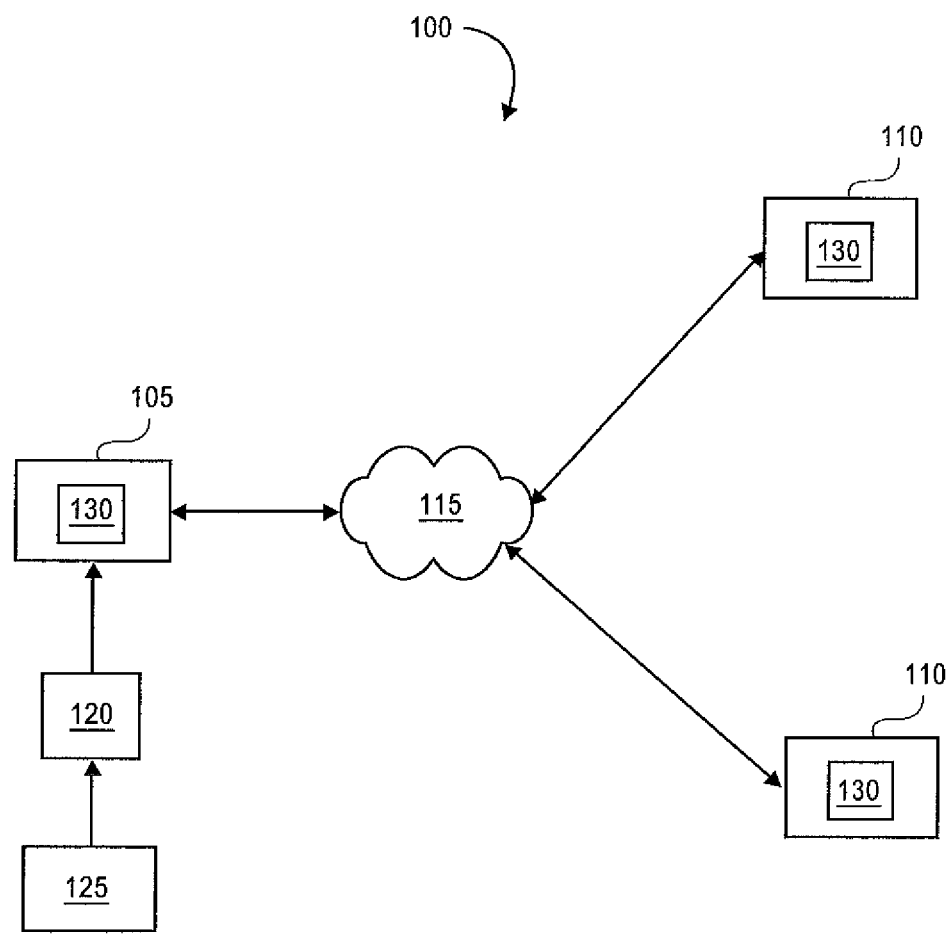
FIG. 1 depicts an exemplary system in accordance with an embodiment.

FIG. 1 illustrates an exemplary system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 can comprise of a website 105 that is coupled to other websites 110 through a network 115. The network 115 can be a local area network, a wide area network, or a combination thereof such as the Internet. Website 105 can be a site where authors can post content (e.g., pictures, video clips, original music, written works, blogs, etc.). These types of websites are fairly well known such as Flickr, Youtube, etc.

An author or user can post or upload content 120 to website 105 through a computer 125. The content 120 can be digital images, video clips, music, written works (e.g., blogs) or any similar content. The computer 125 can be a personal computer, laptop, or networked client that can be Windows based, Mac based, Unix, or open source operating system based (e.g., Linux).

Websites 110 can be websites that syndicate the content from website 105. Website 105 can be configured to provide a web syndication feed (RSS, RDX, ATOM, etc.) to the websites 110. Users at websites 110 can then view the republish content and tag the viewed content.

Websites 105 and 110 can also include a tag control module 130. The tag control module 130 can be configured to receive a list of banned tags from the author of a piece of content 120. The tag control module 130 can associate the entered list of banned tags as a policy. The tag control module 130 can then place the policy with the content for syndication to the other websites 110. As the content and the policy are propagated to subsequent websites 110, the policy can then be enforced at the subsequent websites by the respective tag control module 130, which prevents subsequent users from using any terms listed in the policy from being applied to the syndicated content.

Figure 2:
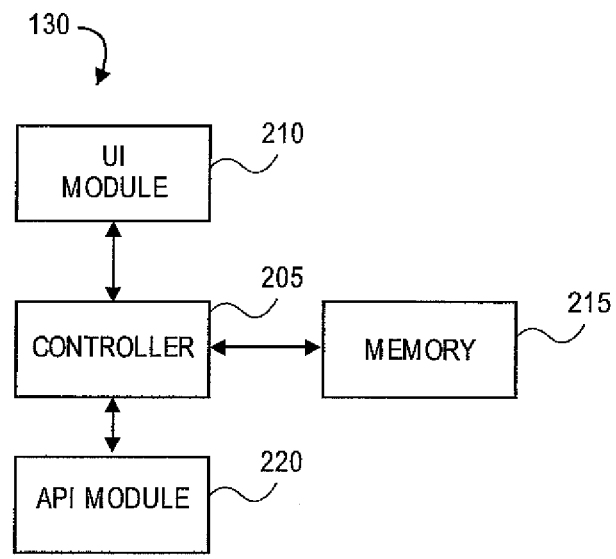
FIG. 2 illustrates an exemplary block diagram of a tag control module in accordance with another embodiment.

FIG. 2 depicts an exemplary block diagram of the tag control module 130 in accordance with another embodiment. It should be readily apparent to those of ordinary skill in the art that the flow diagram 200 depicted in FIG. 2 represents a generalized schematic illustration and that other components may be added or existing components may be removed or modified. Moreover, it should be readily obvious that the respective modules of the tag control module 130 can be implemented in software, hardware or combinations thereof.

As shown in FIG. 2, the tag control module 130 can comprise a controller module 205, a user interface (labeled as "UI") module 210, a memory 215 and an application program interface (labeled as "API") module 220. The controller module 205 can be configured to provide the above-mentioned and later described functionality of the tag control module 130. The controller module 205 can be implemented as software application, a hardware device (e.g., application specific integrated circuit, EEPROM, etc.) or combinations thereof.

The controller 205 can be coupled to the UI module 210. The UI module 210 can be configured to provide a command line or graphical user interface for a user to interact with the tag control module 130. In some embodiments, the UI module 210 can provide a graphical user interface e.g., a web page, for a user to input a list of banned tag terms that cannot be applied to a piece of content. This graphical user interface can also be configured to associate the content with the list of banned tag terms. In some embodiments, the functionality of the UI module 210 can be merged with the controller 205.

The controller 205 can also be coupled to the memory 215. The memory 215 can be configured to provide storage space for banned tag terms that are entered by an author of content. In some embodiments, the memory 215 can also store predetermined lists of banned tag terms developed by the site administrators of the websites 105, 110.

The controller 205 can be further coupled to the API module 220. The API module 220 can be configured to provide an interface to the website to monitor for events. For example, the API module 220 can be configured to detect when an author is uploading content or when a content, policy or a policy update are received at the website.

Figure 3:
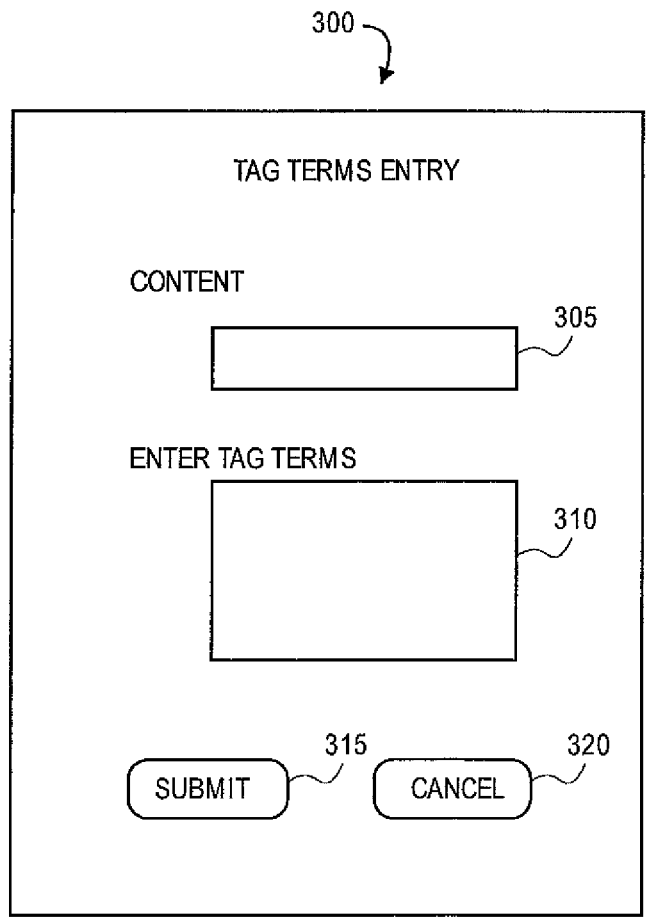
FIG. 3 depicts an exemplary graphical user interface in accordance with yet another embodiment.

FIG. 3 illustrates an exemplary graphical interface (GUI) for the UI module 210 of FIG. 2 in accordance with yet another embodiment. It should be readily apparent to those of ordinary skill in the art that the GUI 300 depicted in FIG. 3 represents a generalized schematic illustration and that other components may be added or existing components may be removed or modified.

As shown in FIG. 3, the GUI 300 can comprise a content entry box 305, a banned tag term entry box 310, a submit button 315 and a cancel button 320. The content entry box 305 can be configured to receive the name of or link to the content being uploaded by the author through the computer 120. The banned tag term entry box 310 can be configured to receive a list of banned tag terms from the author. The author can enter as many banned tag terms as necessary.

The submit button 315 can be configured to forward the name of the content and the list of banned tag terms to the controller 205 of the tag module 130 for processing as previously described and in greater detail below when activated. The cancel button 320 can be configured to close the GUI 300 and discard any data.

Figure 4:
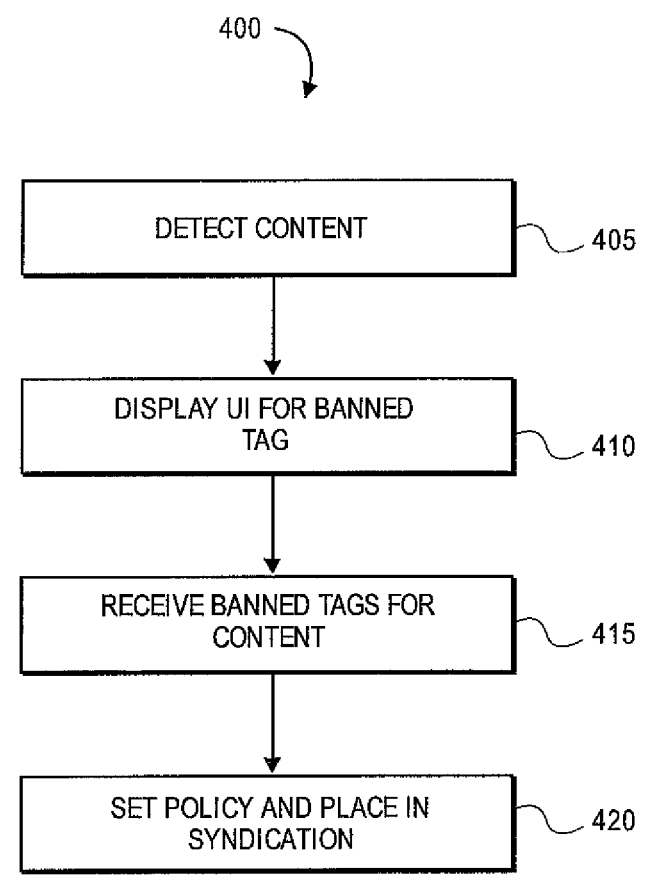
FIG. 4 illustrates an exemplary flow diagram executed by the tag control module in accordance with yet another embodiment.

FIG. 4 illustrates an exemplar flow diagram 400 executed by the tag control module 130 in accordance with yet another embodiment. It should be readily apparent to those of ordinary skill in the art that the flow diagram 400 depicted in FIG. 4 represents a generalized schematic illustration and that other steps may be added or existing steps may be removed or modified.

As shown in FIG. 4, the controller 205 of the tag control module 130 can be configured to detect that the content is being uploaded or posted to the website 105, in step 405. More particularly, the website 105 can include functionality that allows users to upload content to be shared among the users. Examples of this type of uploading can be done at websites such as YouTube, Flickr, etc.

In step 410, the controller 205 can be configured to display GUI 300 for the user to enter a list of banned tag terms for the uploaded content and the name of the content. The controller 205 can then enter a wait state until the user activates the submit 315 or the cancel button 320.

In step 415, the controller 205 can receive the list of banned tag terms and the name of the content in response to the author activating the submit button 315. In step 420, the controller 205 can be configured to associate the list of banned tag terms to the content and set the list of banned tag terms as a policy, i.e., other users are prevented from applying any terms in the list of banned terms on the named content. Subsequently, the content and the policy can be set for web syndication. For example, one method of syndication can be an RSS feed where the content and the policy are placed therein.

Figure 5:
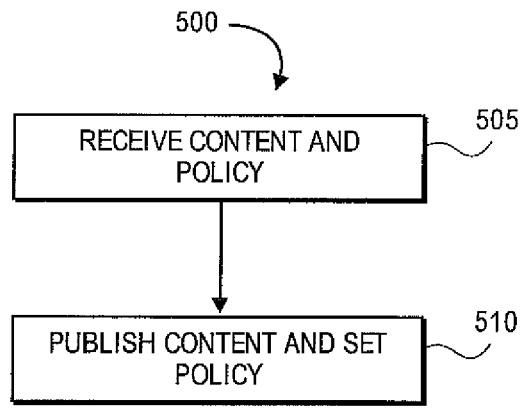
FIG. 5 shows another exemplary flow diagram executed by the tag control module in accordance with yet another embodiment.

FIG. 5 depicts an exemplary flow diagram 500 for a tag control module 130 at a syndicated website, e.g., website 110. It should be readily apparent to those of ordinary skill in the art that the flow diagram 500 depicted in FIG. 5 represents a generalized schematic illustration and that other steps may be added or existing steps may be removed or modified.

As shown in FIG. 5, the controller 205 of a tag control module 130 at a website 110 can be configured to receive the content and policy from the syndication mechanism, e.g., an RSS feed, in step 505.

The controller 505 can then be configured to publish the content and set the policy with the received list of banned tag terms, in step 510. Accordingly, users of website 110 will be prevented from tagging the content with any term from the list of banned tag terms.

In other embodiments, websites 105 and 110 can also have predetermined listed of banned tag terms associated with their respective websites. The controller 205 can be configured to determine any predetermined lists of banned tag terms and include these tag terms as part of the policy.

Figure 6:
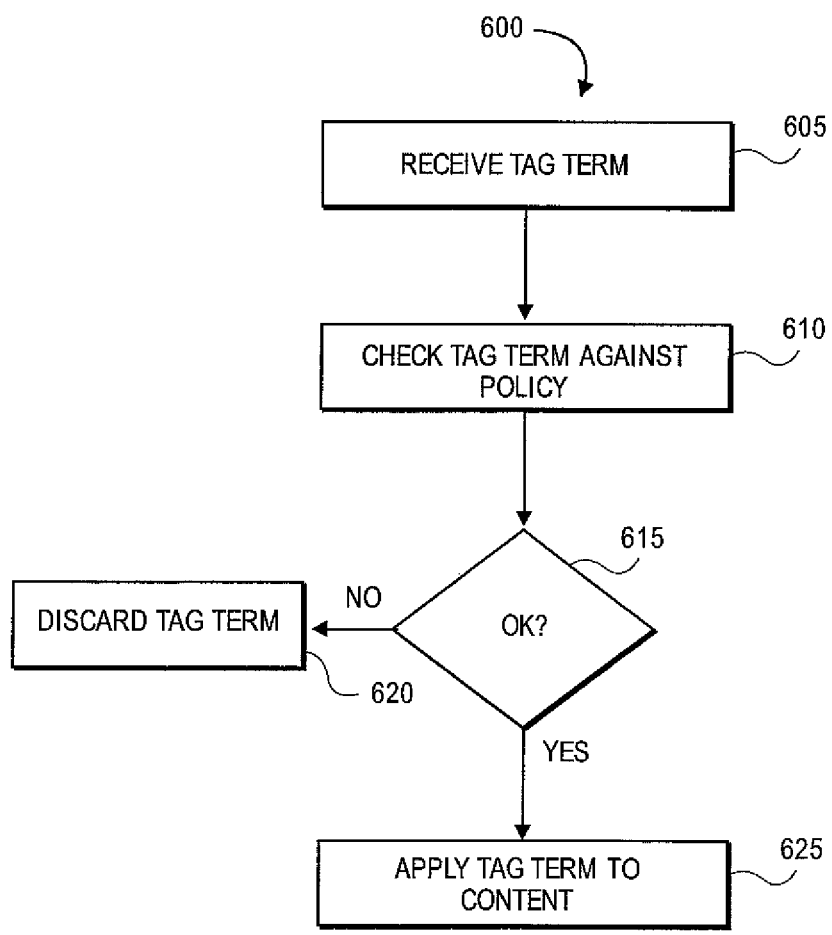
FIG. 6 depicts yet another exemplary flow diagram executed by the tag control module in accordance with yet another embodiment.

FIG. 6 illustrates an exemplary flow diagram 600 for a tag control module 130 at a website (e.g., website 105 or 110) It should be readily apparent to those of ordinary skill in the art that the flow diagram 600 depicted in FIG. 6 represents a generalized schematic illustration and that other steps may be added or existing steps may be removed or modified.

As shown in FIG. 6, the controller 205 can be configured to detect a tag term being applied by a user on a piece of content through the API module 220, in step 605. In step 610, the controller 205 can be configured to check the tag term against the stored policy.

If the prospective tag term is not part of the policy, in step 615, the controller 205 allows the tag term to be applied to the content, in step 625. Otherwise, if the prospective tag term is part of the policy, in step 615, the controller 205 can be configured to reject the prospective tag term, in step 620. In some embodiments, the controller 205 can generate a message to the user that the tag term is a banned tag term.

Figure 7:
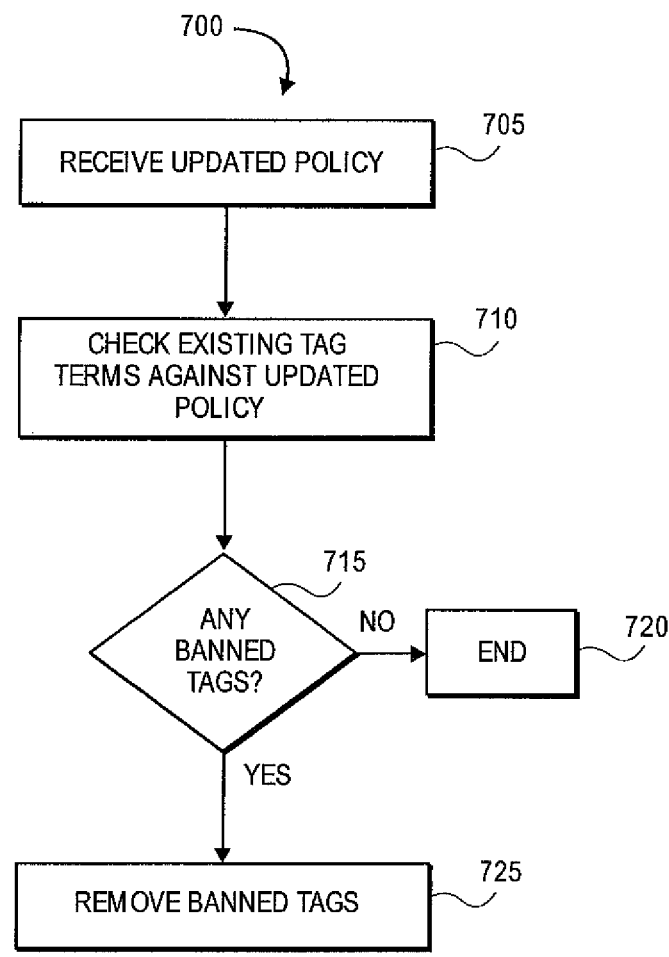
FIG. 7 illustrates yet another exemplary flow diagram by the tag control module in accordance with yet another embodiment.

FIG. 7 illustrates an exemplary flow diagram 700 for a tag control module 130 at a website (e.g., website 105 or 110) It should be readily apparent to those of ordinary skill in the art that the flow diagram 700 depicted in FIG. 7 represents a generalized schematic illustration and that other steps may be added or existing steps may be removed or modified.

As shown in FIG. 7, the controller 205 can be configured to detect an update policy from a syndication channel through the API module 220, in step 705. The controller 205, in step 710, can then be configured to check existing tag terms associated with the content with the received updated policy.

In step 715, the controller 205 can be configured to check whether any of the existing tags are in the updated list of banned tag terms in the updated policy. If any existing tag terms associated with the content are not part of the updated policy, the controller 205 can return to a wait state or end, in step 720. Otherwise, if any of the existing tag terms with the content are included in the updated policy, the controller 205 can be configured to remove the matching banned tag terms from the content.

Figure 8:
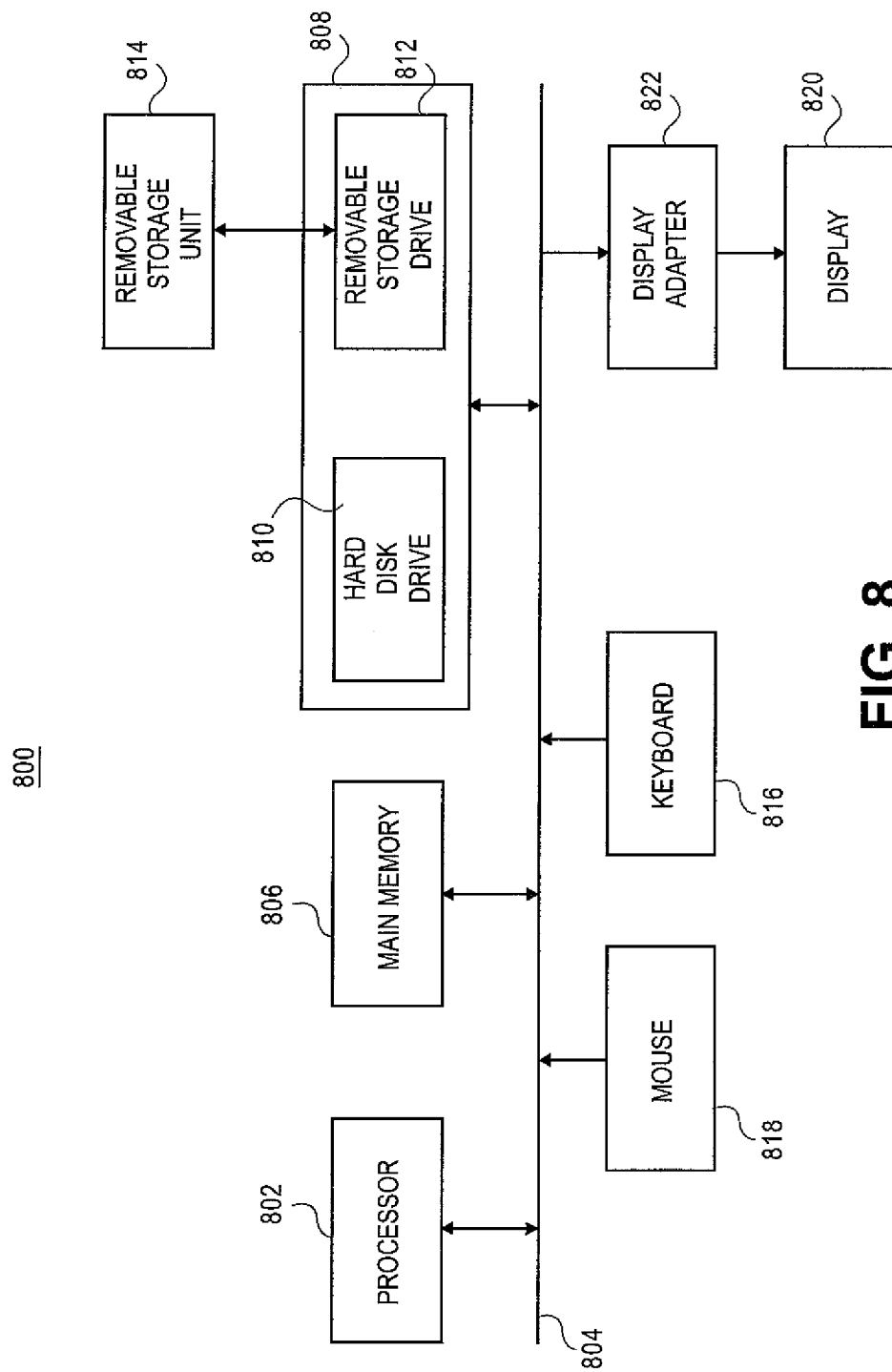
FIG. 8 depicts an exemplary computing platform in accordance with yet another embodiment.

FIG. 8 illustrates an exemplary block diagram of a computing platform 800 where an embodiment may be practiced. The functions of the tag control module 130 may be implemented in program code and executed by the computing platform 800. The tag control module 130 may be implemented in computer languages such as PASCAL, C, C++, JAVA, etc.

As shown in FIG. 8, the computer system 800 includes one or more processors, such as processor 802 that provide an execution platform for embodiments of the tag control module 130. Commands and data from the processor 802 are communicated over a communication bus 804. The computer system 800 also includes a main memory 806, such as a Random Access Memory (RAM), where the tag control module 130 may be executed during runtime, and a secondary memory 808. The secondary memory 808 includes, for example, a hard disk drive 810 and/or a removable storage drive 812, representing a floppy diskette drive, a magnetic tape drive, a compact disk drive, etc., where a copy of a computer program embodiment for the tag control module 130 may be stored. The removable storage drive 812 reads from and/or writes to a removable storage unit 814 in a well-known manner. A user interfaces with the tag control module 130 with a keyboard 816, a mouse 818, and a display 820. The display adapter 822 interfaces with the communication bus 804 and the display 820. The display adapter 822 also receives display data from the processor 802 and converts the display data into display commands for the display 820.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
   receiving, from a syndication feed, a piece of uploaded content and a policy, the policy specifying a non-empty set of banned tags for the piece of uploaded content;
   receiving a request to apply a tag term to the piece of uploaded content;
   determining, by a processor, in view of the policy, whether to apply the tag term to the piece of uploaded content;
   causing display of the uploaded content on a website in view of the determination; and
   detecting that the policy is updated from the syndication feed, and in response to detecting the updated policy:
      receiving the updated policy;
      checking a tag term applied to the piece of uploaded content against the updated policy to identify a banned tag associated with the tag term applied to the piece of uploaded content;
      in response to the tag term violating the updated policy, removing the tag term from the piece of uploaded content displayed on the website.

2. The method of claim 1 further comprising discarding the tag term when the tag term matches any of the banned tags.

3. An apparatus comprising:
   a memory; and
   a processor, operatively coupled to the memory, to:
      receive, from a syndication feed a piece of uploaded content and a policy, the policy specifying a non-empty set of banned tags for the a piece of uploaded content;
      receive a request to apply a tag term to the piece of uploaded content;
      determine, in view of the policy, whether to apply the tag term to the piece of uploaded content;
      cause display of the uploaded content on a website in view of the determination; and
      detect that the policy is updated from the syndication feed, and in response to detecting updated policy:
         receive the updated policy;
         check a tag term applied to the piece of uploaded content against the updated policy to identify a banned tag associated with the tag term applied to the piece of uploaded content; and
         in response to the tag term violating the updated policy, remove the tag term from to the piece of uploaded content displayed on the website.

4. The apparatus of claim 3 wherein the processor is further to discard the tag term when the tag term matches any of the banned tags.

5. The apparatus of claim 3 wherein the set of banned tags is specified by an author of the piece of uploaded content.

6. A non-transitory computer-readable storage medium, comprising instructions stored therein, which when executed, cause a processor to:
- receive, from a syndication feed a piece of uploaded content and a policy, the policy specifying a non-empty set of banned tags for a piece of uploaded content;
- receive a request to apply a tag term to the piece of uploaded content; and
- determine, by the processor, in view of the policy, whether to apply the tag term to the piece of uploaded content;
- cause display of the uploaded content on a website in view of the determination; and
- detect that the policy is updated from the syndication feed, and in response to detecting updated policy:
  - receive the updated policy;
  - check a tag term applied to the piece of uploaded against the updated policy to identify a banned tag associated with the tag term applied to the piece of uploaded content; and
  - in response to the tag term violating the updated policy, remove the tag term from the piece of uploaded content displayed on the website.

7. The non-transitory computer-readable storage medium of claim 6, wherein processor is further to disregard the tag term when the tag term matches any of the banned tags.

* * * * *